Patented July 20, 1943

2,324,522

UNITED STATES PATENT OFFICE 2,324,522

PROCESS FOR THE MANUFACTURE OF KETONES OF THE CYCLOPENTANO POLYHYDROPHENANTHRENE SERIES

Willy Logemann, Berlin-Friedenau, and Walter Hildebrand, Berlin-Pankow, Germany, assignors to Schering Corporation, Bloomfield, N. J., a corporation of New Jersey No Drawing. Application December 22, 1939, Serial No. 310,540. In Germany January 6, 1939

10 Claims. (Cl. 260—397.4)

This invention relates to an improvement in manufacturing ketones of the cyclopentano polyhydrophenanthrene series and is a further development of the process of the copending application Serial No. 213,630, of Serini and Logemann filed June 14, 1938.

In such application there is described the splitting off of water from cyclopentano polyhydrophenanthrene compounds having a hydroxyl group and the group

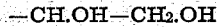

in 17-position and thus obtaining a compound with cortin-like activity (see also "Berichte der deutschen Chemischen Gesellschaft," vol. 71, (1938), page 1364). This process is carried out with comparatively unfavourable yield on employing agents which are usually employed for splitting off water.

Now, the present invention represents an improvement in the method of splitting off acid from glycerol and glycol derivatives as described in the above-mentioned application and consists in treating said starting materials with zinc in finely divided form.

As starting materials there may be used not only cyclopentano polyhydrophenanthrene compounds having a hydroxy group at a carbon atom of the ring system but also such compounds wherein this hydroxy group is replaced by a group convertible thereinto as, for instance, an ester, ether group and the like, and at the same carbon atom a side-chain of the general formula

wherein R indicates a hydroxy group or a group convertible thereinto, for instance, by hydrolysis, such as an ester group and the like and $R_1$ represents hydrogen or a hydroxy group or a group convertible thereinto. In these compounds other substituents may be present in the ring system, such as hydroxyl or keto groups or groups convertible thereinto, especially at the carbon atom 3. Suitable starting materials are mentioned more in detail in the copending application Ser. No. 213,630.

By the process according to this invention ketonic compounds having a side-chain of the general formula

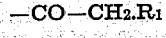

wherein $R_1$ has the above-described meaning are obtained by splitting off the hydroxy group from the carbon atom bearing said side-chain.

The treatment with finely divided zinc, especially with zinc dust is preferably carried out at elevated temperature and under reduced pressure.

The compounds used as starting materials can be obtained according to methods known per se, for instance, according to the above mentioned copending application and "Berichte der deutschen Chemischen Gesellschaft," vol. 71, (1938), pages 1313 ff and pages 1362 ff.

Especially valuable compounds are prepared on employing as starting material compounds having the above described side-chain at the carbon atom 17. Thus, for instance, desoxycorticosterone acetate can be obtained from pregnentriol-17.20.21-one-3 diacetate and pregnenolon acetate from pregnentriol-3.17.20-diacetate-3.20 with good yield said pregnenolon acetate being readily convertible into the corpus luteum hormone, pregnendione-3.20, by oxidation according to methods known per se.

The process may be illustrated by the following formulae wherein R represents a group convertible into a hydroxy group, especially an ester group.

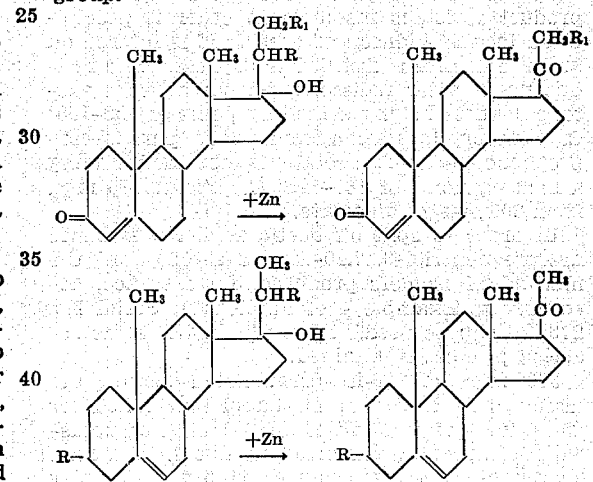

Of course, if R is a group convertible into the hydroxy group, for instance, an ester group, not water but the acid forming the acid radical of said ester group, is split off.

The following examples illustrate the invention without, however, limiting the same to them.

Example 1

0.1 g. of $\Delta_4$-pregnentriol-17.20.21-one-3-diacetate-20.21 are intimately mixed with 1.1 gs. of zinc dust. The mixture is then heated slowly to a temperature of 150–170° C. at a pressure of 10⁻⁴ mm. 51 mgs. sublime at this temperature. After recrystallisation of the sublimate from acetone-pentane the compounds melt at 152–155° C. It is identical with desoxycorticosterone acetate with respect to optical rotation value and melting point. The yield of pure substance is 45%.

Example 2

In the same manner 0.1 g. of pregnene trioldiacetate are mixed with 1.1 gs. of zinc dust and then sublimed.

Pregnenolone acetate is obtained having a melting point of 170–171° C. It yields after saponification and oxidation with aluminum isopropylate in the presence of cyclohexanone preferably followed by a treatment with acid, pregnendione.

Example 3

0.1 g. of allo-pregnantriol diacetate are sublimed with 1.1 gs. of zinc dust in a high vacuum according to Example 1. Allo-pregnanolone acetate is obtained having a melting point of 144° C.

Example 4

A mixture of 0.1 g. of allo-pregnanetetrol triacetate are sublimed with 1.1 gs. of zinc dust in a high vacuum according to the previous examples. Thereby allo-pregnandiolon diacetate is obtained.

Example 5

200 mgs. of $\Delta^{5 \cdot 6}$-pregnentriol-3.17.20-diacetate-3.20 are intimately mixed with 2 gs. of zinc dust in an agate mortar and heated to 120° C. at a pressure of about 0.01 mm. Hg. Colourless needles sublime into the neck of the retort and are removed therefrom by chloroform whereby a small amount of a difficultly soluble by-product remains. The chloroform solutions of several charges and the residue remaining after evaporation of the chloroform are dissolved in very little acetone. From the acetone solution a by-product which is insoluble in ether is precipitated by the addition of ether. It is filtered off and the filtrate is distilled to dryness. The residue yields after redissolving from aqueous acetone, leaflets having a melting point of 158–166° C. By recrystallisation from alcohol pure 17-isopregnenol-3-one-20-acetate is obtained having a melting point of 169–171° C. Yield: 110 mgs. from 200 mgs. of diacetate.

In order to split off acetic acid, the isomeric $\Delta^{5 \cdot 6}$-pregnentriol-3.17.20-diacetate-320 or the mixture of isomers produced, for instance, according to Example 4 of application Serial No. 276,076 can be used. In any case the same reaction product is obtained.

350 mgs. of 17-iso-pregnenolon-acetate are dissolved in 20 ccs. of methanol and boiled for 45 minutes after addition of 200 mgs. of potassium bicarbonate dissolved in 4 ccs. of water. The reaction solution is then poured into water whereupon the precipitated saponification product is filtered off. 235 mgs. of leaflets crystallize from aqueous alcohol having a melting point of 160–165° C. which rises up to 170–172° C. after repeated recrystallisation from dilute alcohol.

Of course, many changes and variations may be made in the starting materials used, the temperatures employed, the duration of reaction, the working up, and purification and other reaction conditions and the like by those skilled in the art in accordance with the principles set forth herein and in the claims annexed hereto.

What we claim is:

1. Process for the production of ketones of the cyclopentano polyhydrophenanthrene series, comprising heating and reacting compounds of the cyclopentano polyhydrophenanthrene series having at the 17-carbon atom of the ring system a member of the class consisting of the hydroxy group and groups convertible thereinto with the aid of hydrolysis, and also a side-chain of the formula

—CHR—CH₂.R₁ wherein R is a member of the class consisting of a hydroxy group and a group convertible thereinto and R₁ consists of a member of the class composed of hydrogen, a hydroxy group and groups convertible thereinto with the aid of hydrolysis, with zinc particles.

2. Process according to claim 1, wherein zinc dust in a finely divided state is employed.

3. Process for the production of ketones of the cyclopentano polyhydrophenanthrene series, comprising heating and reacting compounds of the cyclopentano polyhydrophenanthrene series having at the 17-carbon atom of the ring system an ester group and also a side-chain of the formula

—CHR—CH₂.R₁ wherein R is a member of the class consisting of a hydroxyl group and a group convertible thereinto with the aid of hydrolysis, and R₁ is a member of the class consisting of hydrogen, a hydroxy group and groups convertible thereinto with the aid of hydrolysis, with zinc dust.

4. Process according to claim 1, wherein R and R₁ each consists of an ester group.

5. Process for the manufacture of ketones of the cyclopentano polyhydrophenanthrene series, comprising heating and reacting a pregnentriol-3.17.20, wherein not more than two hydroxy groups are esterified, with zinc dust.

6. Process for the manufacture of ketones of the cyclopentano polyhydrophenanthrene series, comprising heating and reacting a pregnentriol-3.17.20, wherein one of the 17- and 20-hydroxy groups is esterified, with zinc dust.

7. Process for the manufacture of ketones of the cyclopentano polyhydrophenanthrene series, comprising heating and reacting pregnentriol-17.20.21-one-3, wherein the hydroxy groups are esterified, with zinc dust.

8. Process for the manufacture of ketones of the cyclopentano polyhydrophenanthrene series, comprising heating and reacting pregnentriol-17.20.21-one-3, wherein the hydroxy groups are partially esterified, with zinc dust.

9. Process for the production of ketones of the cyclopentano polyhydrophenanthrene series, comprising heating and reacting compounds of the cyclopentano polyhydrophenanthrene series having at the 17-carbon atom of the ring system a member of the class consisting of the hydroxy group and groups convertible thereinto with the aid of hydrolysis, and also a side-chain of the formula

—CHR—CH₂.R₁ wherein R is a member of the class consisting of a hydroxy group and a group convertible thereinto and R₁ consists of a member of the class composed of hydrogen, a hydroxy group and groups convertible thereinto with the aid of hydrolysis, with zinc dust.

10. Process for the production of ketones of the cyclopentano polyhydrophenanthrene series, comprising heating and reacting compounds of the cyclopentano polyhydrophenanthrene series having at the 17-carbon atom of the ring system a member of the class consisting of the hydroxy group and groups convertible thereinto with the aid of hydrolysis, and also a side-chain of the formula

—CHR—CH$_2$.R$_1$ wherein R is a member of the class consisting of a hydroxy group and a group convertible thereinto and R$_1$ consists of a member of the class composed of hydrogen, a hydroxy group and groups convertible thereinto with the aid of hydrolysis, with zinc dust, in a vacuum.

WILLY LOGEMANN.
WALTER HILDEBRAND.